US009372006B2

(12) United States Patent
McKee et al.

(10) Patent No.: US 9,372,006 B2
(45) Date of Patent: Jun. 21, 2016

(54) COMPACT OVEN

(71) Applicant: Ovention, Inc., Milwaukee, WI (US)

(72) Inventors: Philip R. McKee, Frisco, TX (US); Lee Thomas Vanlanen, McKinney, TX (US); Alex Johnson, Dallas, TX (US)

(73) Assignee: Ovention, Inc., Milwaukee, WI (US)

( * ) Notice: Subject to any disclaimer, the term of this patent is extended or adjusted under 35 U.S.C. 154(b) by 307 days.

(21) Appl. No.: 13/888,151

(22) Filed: May 6, 2013

(65) Prior Publication Data

US 2014/0326710 A1 Nov. 6, 2014

(51) Int. Cl.
*A21B 1/00* (2006.01)
*F24C 15/32* (2006.01)
*A21B 1/24* (2006.01)

(52) U.S. Cl.
CPC ............... *F24C 15/325* (2013.01); *A21B 1/245* (2013.01)

(58) Field of Classification Search
CPC ...... F24C 15/32; F24C 15/325; F24C 15/322; A21B 1/245; A21B 1/48; A21B 1/26; A21B 1/28; A21B 1/33; A21B 1/36; A21B 1/42; A21B 1/44; A21B 1/46; F27D 7/00; F27D 7/04; F27B 17/0083
See application file for complete search history.

(56) References Cited

U.S. PATENT DOCUMENTS 4,556,043 A 12/1985 Bratton
4,591,333 A 5/1986 Henke
4,626,661 A * 12/1986 Henke ........................... 219/400
4,749,581 A 6/1988 Gorsuch et al.
5,584,237 A * 12/1996 Moshonas .................. 99/443 C
5,717,192 A 2/1998 Dobie et al.
5,934,178 A 8/1999 Caridis et al.
6,880,545 B2 4/2005 Heber et al.
7,624,728 B1 12/2009 Forbes
2005/0132899 A1 6/2005 Huang et al.
2005/0205547 A1 9/2005 Wenzel
2008/0216812 A1 9/2008 Dougherty

FOREIGN PATENT DOCUMENTS

EP 0286759 A2 10/1988
EP 1795811 A2 6/2007
WO 98/23903 * 6/1998
WO 9823903 A1 6/1998

OTHER PUBLICATIONS

PCT/US2014/034357 ISR & WO; Dec. 4, 2014; 19 pages.

* cited by examiner

*Primary Examiner* — Shawntina Fuqua
(74) *Attorney, Agent, or Firm* — Quarles & Brady LLp

(57) ABSTRACT

A compact oven is disclosed. The compact oven includes a housing having a cavity for receiving food items, and one or more blowers for directing heated air into the cavity. The compact oven also includes an air deflection plate coupled to a nozzle plate having multiple nozzles for capturing and directing a portion of heated air from the blower to the cavity via nozzles located between the air deflection plate and the nozzle plate, while allowing the remaining heated air exiting the blower to move into the cavity via nozzles not located between the air deflection plate and the nozzle plate such that the velocities of heated air exiting all nozzles into the cavity are as close to each other as possible.

15 Claims, 4 Drawing Sheets

COMPACT OVEN

RELATED PATENT APPLICATIONS

The present patent application is related to co-pending applications:

1. U.S. Ser. No. 13/077,143, filed on Mar. 31, 2011, entitled "MATCHBOX OVEN;" and
2. U.S. Ser. No. 13/399,840, filed on Feb. 17, 2012, entitled "CONVEYOR OVEN."

BACKGROUND OF THE INVENTION

1. Technical Field

The present invention relates to compact ovens in general, and in particular to a compact oven having a high volume of even airflow with tight columns of air impingement.

2. Description of Related Art

For a conventional oven, the profile of the heat energy for cooking food items located inside a cavity of the oven is typically determined by the mechanical configuration of a heating source. For example, a conventional oven may contain one or more variable speed blowers that can be set at a specific rotations per minute (RPM) to deliver a given volume of heated air via one or more plenums. The temperature of the rapidly moving heated air can be readily maintained at or near a temperature set by a temperature control feedback loop.

In order to accelerate cook time, some ovens employ a technique known as air impingement. Air impingement can be achieved by moving heated air rapidly from one or more plenums through a set of nozzles located in the periphery of an oven cavity, thereby causing columns of the heated air to come into more direct contact with a food item as the heated air pierces the temperature gradients that surround the food item placed within the oven cavity. Since tighter columns of air at the food surface can improve the rate of heat transfer from the impinging air, cooking times are reduced as a result. Increasing airflow volume, which is typically measured in cubic feet per minute (CFM), can further reduce cook times of a food item because more hot air mass can be moved past the surface of the food item, thereby improving the rate of heat transfer to the food item.

There are many challenges, however, to achieving tighter columns and higher CFM of heated air inside an oven cavity. At a given blower speed, reducing nozzle size increases air velocity, thereby tightening the air columns, but the air volume is also reduced due to the increase in back pressure caused by the reduced nozzle size. The opposite is true as well—at a given blower speed, increased nozzle size increases air volume but reduces air velocity through the nozzles and loosens the air columns that are important to the air impingement process. Increased blower speed is a commonly used alternative, but this method is problematic in smaller ovens where elevated blower speeds cause uneven air distribution in a relatively small blower plenum.

SUMMARY OF THE INVENTION

The present invention provides an improved method for evenly heating food items placed within a relatively small oven cavity of a compact oven. In accordance with a preferred embodiment of the present invention, a compact oven includes a housing having a cavity for receiving food items, and one or more blowers for directing heated air into the cavity. The compact oven also includes an air deflection plate coupled to a nozzle plate having multiple nozzles for capturing and directing a portion of heated air from the blower to the cavity via nozzles located between the air deflection plate and the nozzle plate, while allowing the remaining heated air exiting the blower to move into the cavity via nozzles not located between the air deflection plate and the nozzle plate such that the velocities of heated air exiting all nozzles into the cavity are as close to each other as possible.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
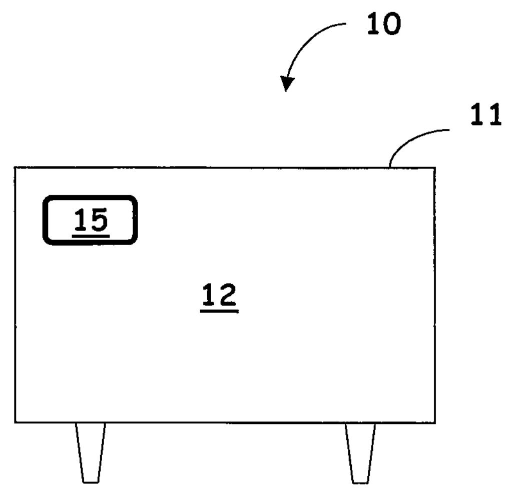
FIG. 1 is a front view of a compact oven, in accordance with a preferred embodiment of the present invention.

Referring now to the drawings and in particular to FIG. 1, there is depicted a front view of a compact oven, in accordance with a preferred embodiment of the present invention. As shown, a compact oven 10 is defined by a housing 11 having a cavity 12. Compact oven 10 is generally smaller in size than a conventional oven, and the footprint area of cavity 12 ranges between approximately 1.0 square foot and 2.5 square feet, and preferably no larger than approximately 4.0 square feet. Compact oven 10 includes a heating and airflow system (to be described in details later) to supply heat to cavity 12 for heating any food items placed within cavity 12.

An operator can enter operating parameters, such as cooking temperature, cooking time, blower speed, etc., via a control panel 15 to effectuate cooking controls on any food items placed within cavity 12. Control panel 15 is preferably implemented with touchscreens but it can also be implemented with keypads and liquid crystal displays.

Figure 2:
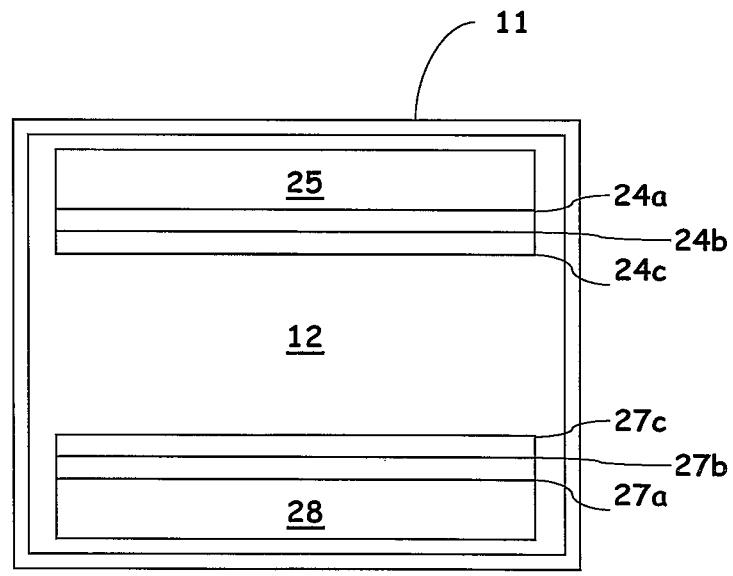
FIG. 2 is a cross-sectional view of a compact cavity within the oven from FIG. 1, in accordance with a preferred embodiment of the present invention.

With reference now to FIG. 2, there is depicted a cross-sectional view of housing 11, in accordance with a preferred embodiment of the present invention. Any food item intended to be cooked by compact oven 10 can be placed inside cavity 12 where food will be heated. Since the footprint area of cavity 12 is relatively small, a food item placed within cavity 12 typically spans substantially the entire footprint area of cavity 12. As shown, housing 11 also contains a top plenum 25 and a bottom plenum 28. Top plenum 25 is connected to top nozzle plates 24*a*-24*c*. Bottom plenum 28 is connected to bottom nozzle plates 27*a*-27*c*. Top nozzle plates 24*a*-24*c*, top plenum 25, bottom nozzle plates 27*a*-27*c* and bottom plenum 28 are part of the heating and airflow system for compact oven 10. Heated air in top plenum 25 and bottom plenum 28 are in gaseous communication with cavity 12 through top nozzle plates 24*a*-24*c* and bottom nozzle plates 27*a*-27*c*, respectively.

Figure 3A:
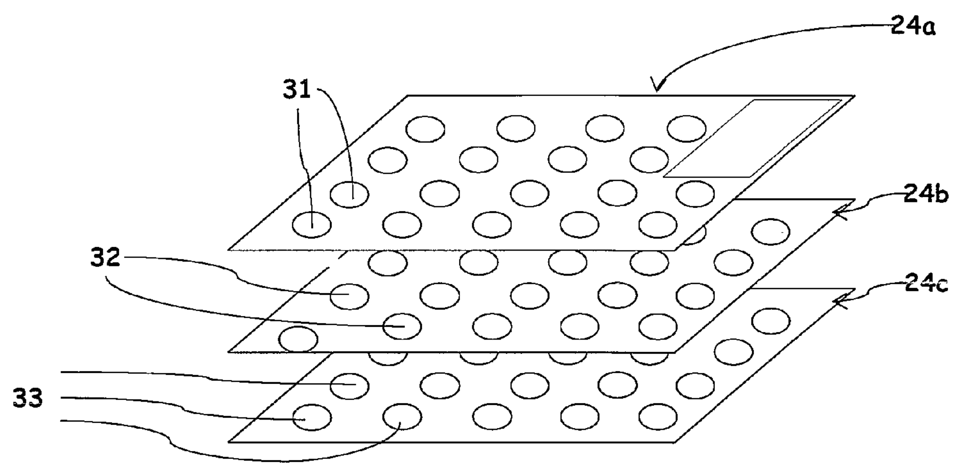
FIG. 3*a* is an isometric view of three top nozzle plates within the cavity from FIG. 2, in accordance with a preferred embodiment of the present invention.
Figure 3B:
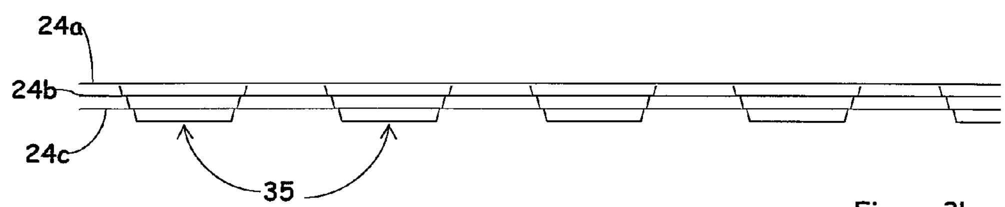
FIG. 3*b* is a cross-sectional view of three top nozzle plates within the cavity from FIG. 2, in accordance with a preferred embodiment of the present invention.

Referring now to FIG. 3*a*, there is depicted an isomeric view of top nozzle plates 24*a*-24*c*, in accordance with a preferred embodiment of the present invention. As shown, top nozzle plate 24*a* includes multiple holes 31, top nozzle plate 24*b* includes multiple holes 32, and top nozzle plate 24*c* includes multiple holes 33. Preferably, each of multiple holes 31-33 are themselves formed as nozzles. The positions (and number) of holes 31 in top nozzle plate 24*a* are identical to the positions of holes 32 on top nozzle plate 24*b* as well as the positions of holes 33 on top nozzle plate 24*c*. Basically, each column of holes 31-33 are concentric holes. In addition, holes 31 are slightly larger than holes 32, and holes 32 are slightly larger than holes 33. Thus, top nozzle plates 24*a*-24*c* can be conveniently stacked together to allow each column of holes 31-33 to form an extended nozzle-like feature 35, as shown in FIG. 3*b*. This stack-plate configuration in essence replaces the need for using more extended nozzles to direct tighter columns of hot pressured airstream towards any food items placed within cavity 12.

Preferably, the diameters of holes 31, 32 and 33 are approximately 0.575 inch, 0.475 inch and 0.375 inch, respectively. In addition, there is approximately one hole 31 per 2.25 square inch on each of top nozzle plates 24*a*-24*c* to allow maximum cubic feet per minute (CFM) of airflow per square inch. The configurations of bottom nozzle plates 27*a*-27*c* are substantially the same as top nozzle plates 24*a*-24*c*, respectively, except that the nozzles in top nozzle plates 24*a*-24*c* are offset from the nozzles in bottom nozzle plates 27*a*-27*c* such that the air columns formed by air exiting top nozzle plates 24*a*-24*c* are directed between the air columns formed by the air exiting bottom nozzle plates 27*a*-27*c*. In the present embodiment, while air enters cavity 12 via both top plenum 25 and bottom plenum 28 in FIG. 4, it is understood by those skilled in the art that air can enter cavity 12 through only one of top plenum 25 or bottom plenum 28.

Figure 4:
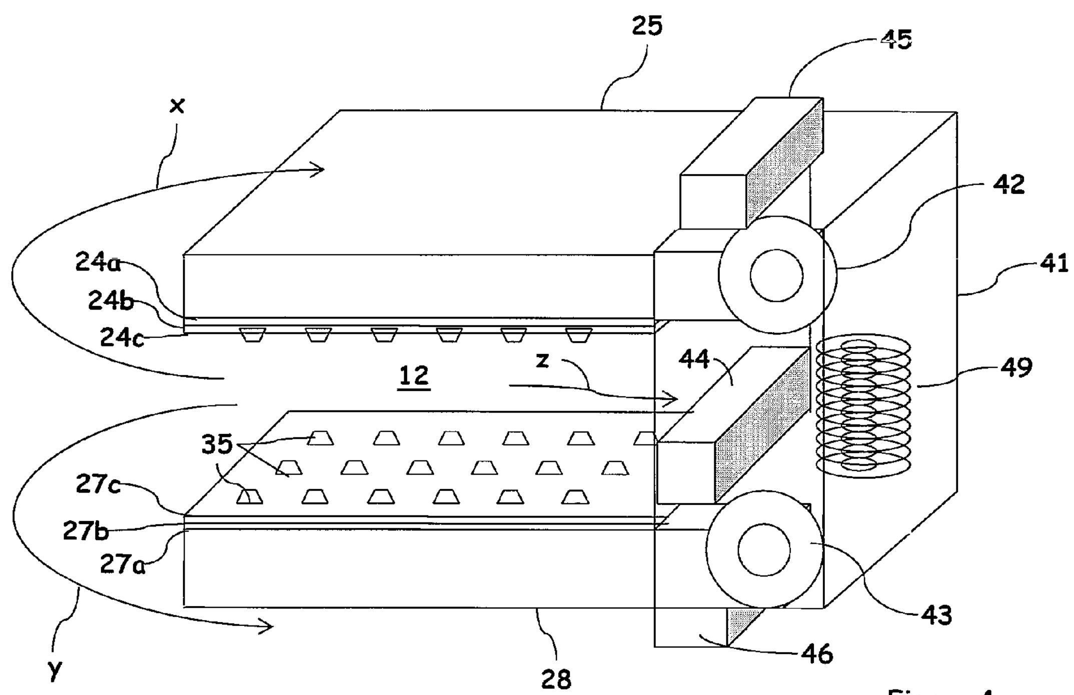
FIG. 4 is a diagram of a heating and airflow system within the compact oven from FIG. 1, in accordance with a preferred embodiment of the present invention.

With reference now to FIG. 4, there is depicted a diagram of the heating and airflow system within compact oven 10, in accordance with a preferred embodiment of the present invention. As shown, the heating and airflow system includes a heater plenum 41 located at the back of compact oven 10. Heater plenum 41 includes a heater 49. After air has been sufficiently heated by heater 49, the heated air is then directed to top plenum 25 via a top blower 42 and to bottom plenum 28 via a bottom blower 43. The pressurized hot air formed within top plenum 25 is subsequently directed to cavity 12 via multiple nozzle-like features 35 formed by stacked top nozzle plates 24*a*-24*c* (from FIGS. 3*a*-3*b*). Similarly, pressurized hot air formed within bottom plenum 28 is subsequently directed to cavity 12 via multiple nozzle-like features 35 formed by stacked bottom nozzle plates 27*a*-27*c*. Although heated air is shown to be sent to top air plenum 25 and bottom plenum 28 via separate blowers, it is understood by those skilled in the art that heated air can be sent to both top plenum 25 and bottom plenum 28 via a single blower.

The heated air within cavity 12 can be returned to heater plenum 41 via a center intake opening 44 located inside cavity 12 by following path z. The heated air within cavity 12 can also be returned to heater plenum 41 via a top intake opening 45 by following path x (i.e., over top air plenum 25) and via a bottom intake opening 46 by following path y (i.e., under bottom air plenum 28). Center intake opening 44, path z, top intake opening 45, path x, bottom intake opening 46 and path y are configured to allow maximum CFM of airflow to return to heater plenum 41, preferably at a rate that exceeds 2.5 CFM per square inch of footprint surface area in cavity 12.

In a preferred embodiment of the present invention, cavity 12 has a footprint area of approximately 2.125 square feet. Top nozzle plates 24*a*-24*c* and bottom nozzle plates 27*a*-27*c* each contain approximately 136 extended nozzle-like features 35 resulting in approximately one extended nozzle-like feature 35 per 2.125 square inch. Center intake opening 44 has an open surface area of approximately 22 square inches leading to heater plenum 41. Each of top intake opening 45 and bottom intake opening 46 have an open surface area of approximately 20 square inches leading to heater plenum 41. Each of top blower 42 and bottom blower 43 is configured to deliver average velocities of approximately 90 feet per second through extended nozzle-like features 35 in top nozzle plates 24*a*-24*c* and bottom nozzle plates 27*a*-27*c* when measured by a TSI Velocicalc hot wire anemometer with the measuring wand placed at the exit orifice of each of the 272 extended nozzle-like features 35 in top nozzle plates 24*a*-24*c* and bottom nozzle plates 27*a*-27*c*. Each of holes 33 in top nozzle plate 24*c* have a diameter of approximately 0.375 inch, yielding a hole area of approximately 0.11045 square inch, and bottom nozzle plate 27*c* is substantially the same as top nozzle plate 24*c*. At the average measured air velocity of approximately 90 feet per second, the total volume of air passing through cavity 12 is determined to be approximately 1,100 CFM in the present preferred embodiment, which equates to approximately 3.4 CFM per square inch of footprint area in cavity 12.

Figure 5A:
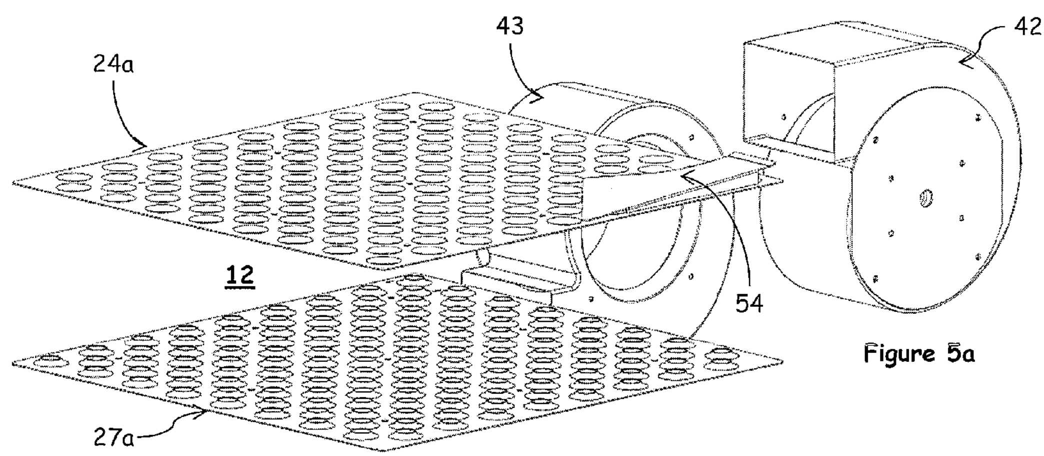
FIGS. 5*a*-5*b* are detailed views of the top and bottom nozzle plates within the heating and airflow system from FIG. 4.
Figure 5B:
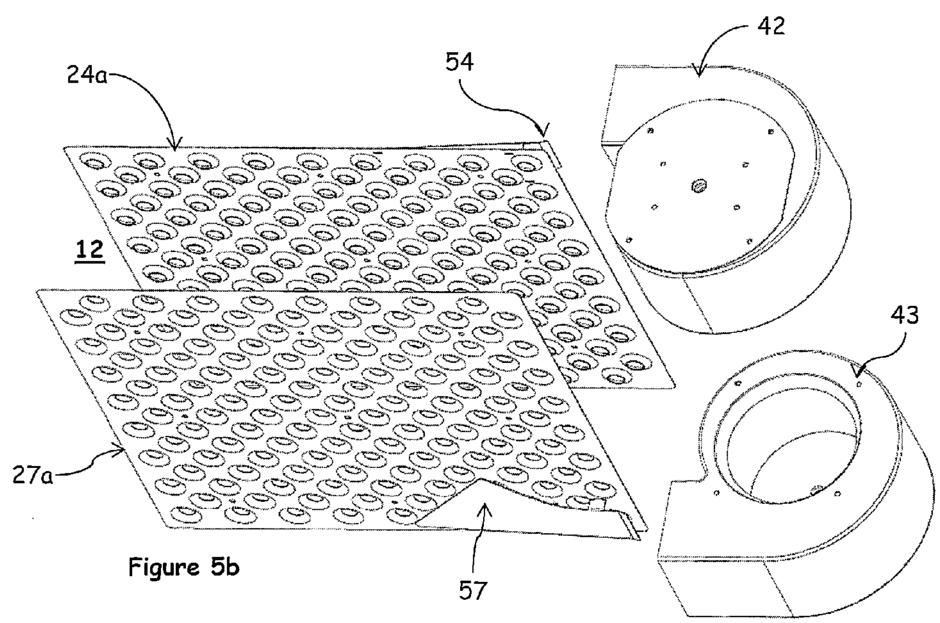
Figure 6:
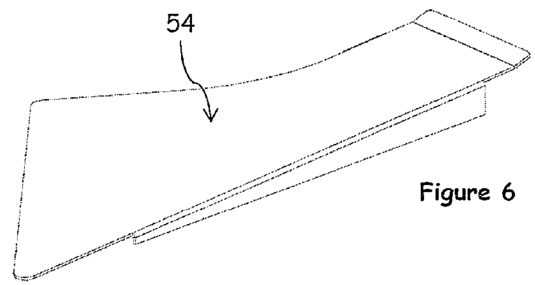
FIG. 6 is a detailed diagram of an air deflection plate attached to the top nozzle plate from FIG. 5*a*.

Referring now to FIGS. 5*a*-5*b*, there are illustrated the details of top nozzle plate 24*a* and bottom nozzle plate 27*a*. As shown, top nozzle plate 24*a* includes an air deflection plate 54 attached to one of its corners (or edges) most adjacent to top blower 42. A detailed diagram of air deflection plate 54 is shown in FIG. 6. Along with a section of top nozzle plate 24*a*, air deflection plate 54 captures and directs a portion of the heated air exiting top blower 42 into cavity 12 via the nozzles located between air deflection plate 54 and top nozzle plate 24*a*, while the remaining heated air exiting top blower 42 goes into cavity 12 via the nozzles not located between air deflection plate 54 and top nozzle plate 24*a*. The size and shape of air deflection plate 54 as well as the height between air deflection plate 54 and top nozzle plate 24*a* are selected to allow a sufficient portion of the air exiting top blower 42 to be directed through the nozzles in top nozzle plate 24*a* located between air deflection plate 54 and top nozzle plate 24*a* so that the velocity of air exiting all nozzles of top nozzle plates 24*a*-24*c* into cavity 12 are as close to each other as possible.

Similarly, bottom nozzle plate 27*a* includes an air deflection plate 57 attached to one of its corners (or edges) most adjacent to bottom blower 43. The shape and size of air deflection plate 57 should be similar, if not identical, to air deflection plate 54. Along with a section of bottom nozzle plate 27*a*, air deflection plate 57 captures and directs a portion of the heated air exiting bottom blower 43 into cavity 12 via the nozzles located between air deflection plate 57 and bottom nozzle plate 27*a*, while the remaining heated air exiting bottom blower 43 goes into cavity 12 via the nozzles not located between air deflection plate 57 and bottom nozzle plate 27*a*. The size and shape of air deflection plate 57 as well as the height between air deflection plate 57 and bottom nozzle plate 27*a* are selected to allow a sufficient portion of the air exiting bottom blower 43 to be directed through the nozzles in bottom nozzle plate 27*a* located between air deflection plate 57 and bottom nozzle plate 27*a* so that the velocity of air exiting all nozzles of bottom nozzle plates 27*a*-27*c* into cavity 12 are as close to each other as possible.

For the present embodiment having an average velocity of air exiting 136 extended nozzle-like features 35 in each of top nozzle plates 24*a*-24*c* and bottom nozzle plates 27*a*-27*c* at 90 feet per second, the standard deviation of air velocities exiting those 136 extended nozzle-like features 35 is approximately 9 feet per second.

It will be understood by those skilled in the art that the benefits derived by air deflection plates 54 and 57 are not dependent on their being multiple nozzle plates 24*a*-24*c* and 27*a*-27*c*, respectively, and that other means of placement of air deflection plates 54 and 57 besides attachment to top nozzle plate 24*a* and bottom nozzle plate 27*a* would produce similar results.

As has been described, the present invention provides a compact oven having an improved method for heating food items.

While the invention has been particularly shown and described with reference to a preferred embodiment, it will be understood by those skilled in the art that various changes in form and detail may be made therein without departing from the spirit and scope of the invention.

What is claimed is:

1. An oven comprising:

a housing;

a cavity, located within said housing, for receiving food items;

a blower for delivering heated air to said cavity; and an air deflection plate coupled to a nozzle plate having a plurality of nozzles for capturing and directing a portion of heated air from said blower to said cavity via nozzles located between said air deflection plate and said nozzle plate, while allowing the remaining heated air exiting said blower to move into said cavity via nozzles not located between said air deflection plate and said nozzle plate such that the velocities of heated air exiting all nozzles into said cavity are as close to each other as possible, said nozzle plate only allowing said heated air to pass from said blower to said cavity.

2. The oven of claim 1, wherein diameters of said plurality of nozzles are approximately 0.375 inch.

3. The oven of claim 1, wherein said nozzle plate has approximately one hole per 2.25 square inch to allow maximum cubic feet per minute (CFM) of airflow per square inch per cavity footprint area.

4. The oven of claim 1, wherein said oven includes three air intakes for collecting heated air from said cavity.

5. The oven of claim 4, wherein said three air intakes collect heated air from said cavity in three orthogonal directions.

6. An oven comprising:

a housing;

a cavity, located within said housing, for receiving food items;

a blower for delivering heated air to said cavity; and a plenum and a set of plates located within said cavity, wherein each plate of said set of plates includes a plurality of holes, and each of said plurality of holes forms a nozzle, and wherein said set of plates are stacked together to provide a plurality of concentric holes formed by said nozzle of one of said plurality of plates contacting another of said plurality of plates to form a plurality of nozzle-like features to direct heated air from said blower to a food item placed within said cavity for heating up said food item.

7. The oven of claim 6, wherein said cavity includes a second plenum and a second set of plates stacked together to provide a plurality of concentric holes to form a plurality of nozzle-like features to direct heated air to said cavity for heating up said food item.

8. The oven of claim 6, wherein holes in one of said first set of plates have a different diameter from holes in another one of said first set of plates.

9. The oven of claim 6, wherein the hole diameter in a first one of said plates is approximately 0.575 inch, the hole diameter in a second one of said plates is approximately 0.475 inch, and the hole diameter in a third one of said plates is approximately 0.375 inch.

10. The oven of claim 6, wherein one of said plates has approximately one hole per 2.25 square inch to allow maximum cubic feet per minute (CFM) of airflow per square inch of cavity footprint area.

11. The oven of claim 6, wherein said oven includes three air intakes for collecting heated air from said cavity.

12. The oven of claim 11, wherein said three air intakes collect heated air from said cavity in three orthogonal directions.

13. An oven comprising:

a housing;

a cavity, located within said housing, for receiving food items;

a blower for delivering heated air to said cavity; and three separate air intakes for collecting air from said cavity in three orthogonal directions at a rate greater than 2.5 cubic feet per minute (CFM) per square inch of cavity footprint area, wherein each of said three separate air intakes directly provide said collected air from said cavity to a heater plenum.

14. The oven of claim 13, wherein said oven further includes an air deflection plate coupled to a nozzle plate having a plurality of nozzles for directing a portion of heated air from said blower to said cavity via nozzles located between said air deflection plate and said nozzle plate, while allowing the remaining heated air exiting said blower to move into said cavity via nozzles not located between said air deflection plate and said nozzle plate such that the velocities of heated air exiting all nozzles into said cavity are as close to each other as possible.

15. Oven of claim 14, wherein said nozzle plate is formed by a plurality of plates stacked together to provide a plurality of concentric holes to form said nozzles.

* * * * *